United States Patent [19]
Coberley

[11] 3,813,524
[45] May 28, 1974

[54] INDUSTRIAL MACHINE CONTROLLER

[75] Inventor: Daniel A. Coberley, Danville, Ill.

[73] Assignee: Hurletron Incorporated, Danville, Ill.

[22] Filed: Nov. 24, 1971

[21] Appl. No.: 201,859

[52] U.S. Cl......... 235/92 T, 235/92 R, 235/92 PD, 235/92 DN, 235/92 CC
[51] Int. Cl. .......................................... G06m 7/06
[58] Field of Search......... 235/92 T, 92 DN, 92 PD, 235/92 CV

[56] References Cited
UNITED STATES PATENTS

| 3,272,969 | 9/1966 | Cutaia | 235/92 DN |
| 3,591,776 | 7/1971 | Sylvester | 235/92 DN |

*Primary Examiner*—Paul J. Henon
*Assistant Examiner*—Robert F. Gnuse
*Attorney, Agent, or Firm*—Hill, Sherman, Meroni, Gross & Simpson

[57] ABSTRACT

A digital industrial control system for effecting operations on objects moving at variable speed by controlling on and off intervals of a mechanical actuator, and utilizing encoder pulses to reflect distance of movement of the objects while digitally compensating for actuator delay by introducing an extra count proportional to speed.

4 Claims, 12 Drawing Figures

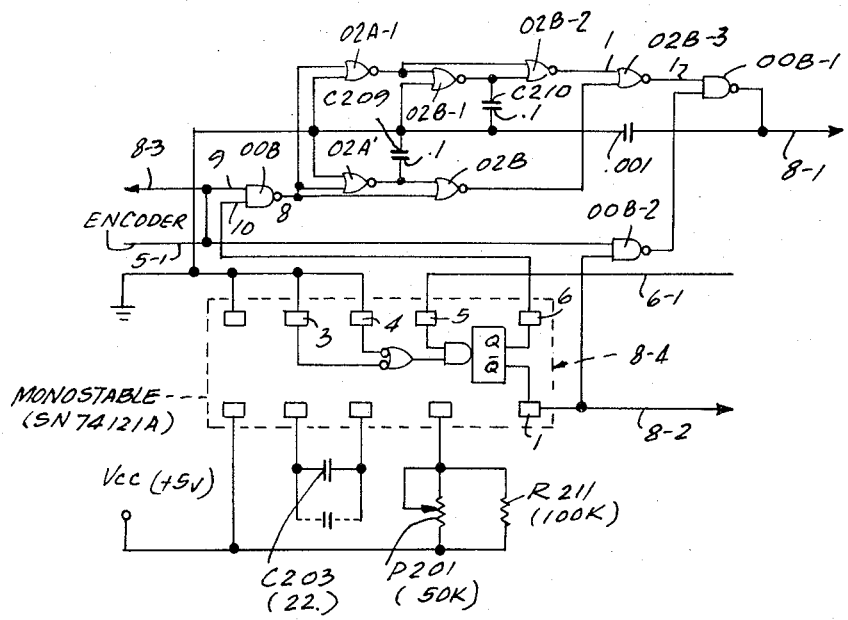
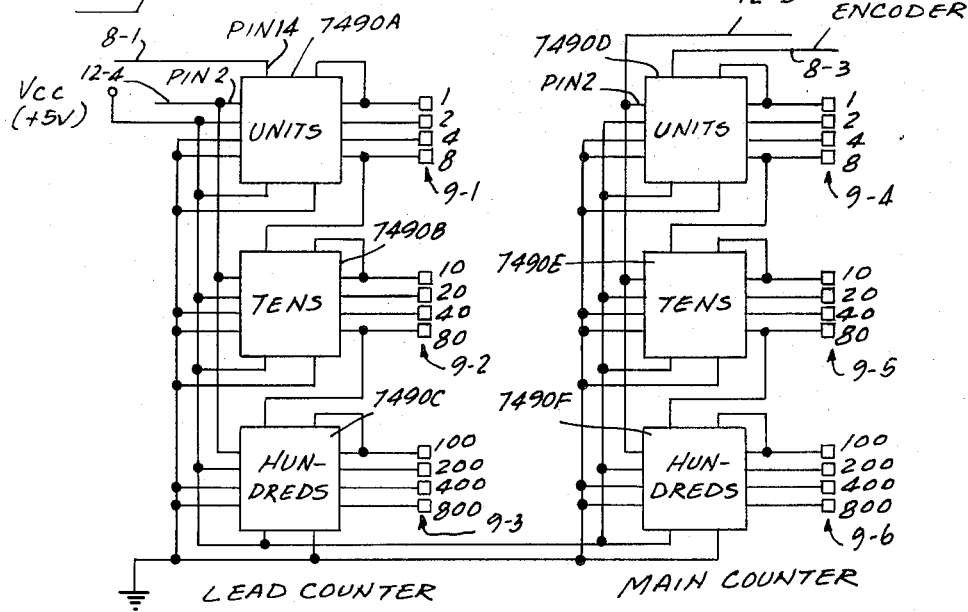

3,813,524

INDUSTRIAL MACHINE CONTROLLER

SUMMARY OF THE INVENTION

This invention relates to an industrial control system for controlling on and off intervals of a mechanical actuator, and particularly to such a system for controlling operations on moving material, usually discrete articles such as carton blanks, where the time delay in effecting on or off conditions of the actuator may be a material factor.

It is found that there is a commercial need for a reliable and accurate interval timer which is effective for a production line subject to speed variations and to time delays in the response of actuators operating on the material. In one application, for example, it was required to accurately apply glue lines to pie carton blanks. A failure in accuracy could cause sticking in a stack of such blanks with the result that the carton filling machine would fail to properly open a carton and instead eject a pie onto the floor. Such disorderly consequences can lead to highly exacting standards of accuracy and reliability which should be met for a commercially successful industrial interval controller intended to be of general utility.

It is therefore an object of the invention to provide an industrial control system which is capable of reliable operation in the industrial environment while meeting stringent standards of accuracy, and yet which is extremely simple to set up and will not require readjustments under normal conditions of speed variation or the like.

Another object of the invention is to provide a digitally operated industrial interval control system which operates in terms of increments of movement of the work to be operated upon and thus is capable of accurate operation independently of speed of movement of the work, the digital control system being conveniently adjustable to take into account the time delays incident to effecting operations on the work which are not speed dependent.

A further object is to provide a rugged and reliable industrial interval control system which does not require an expensive power supply or elaborate cabinet shielding, and which is readily manufactured in a variety of models to meet varying requirements, with minimum design changes so as to promote economy and simplicity of manufacture.

Other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 8 shows a preferred electric current for the actuator compensator of FIG. 1;

FIG. 9 is a diagrammatic illustration of preferred lead counter and main counter components of the system of FIG. 1;

DETAILED DESCRIPTION OF THE PREFERRED EMBODIMENT

Figure 1:
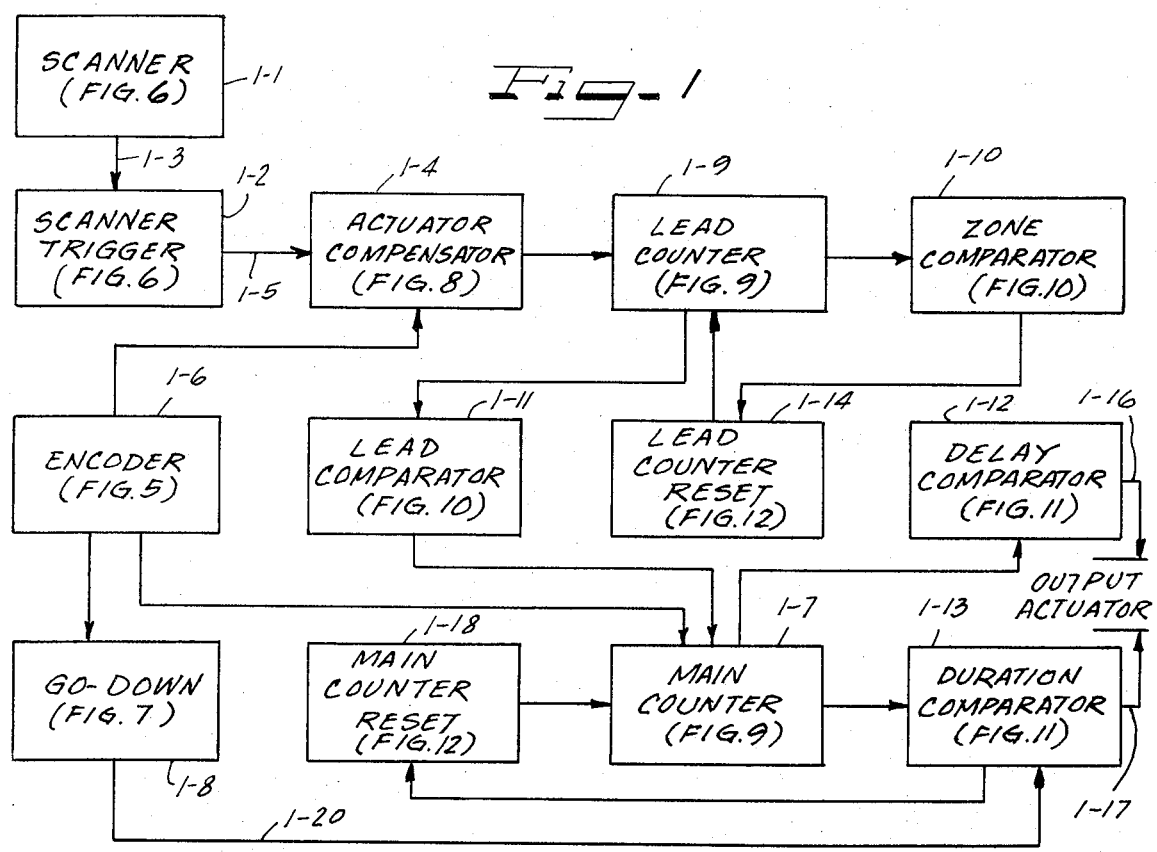
FIG. 1 illustrates a block diagram of an industrial interval control system in accordance with the present invention, illustrative details of the various components being shown in the indicated figures.

In FIGS. 1 through 12, reference numerals have been applied to certain parts in the form of a first digit followed by a hyphen and a further digit or digits. In such cases the first digit corresponds to the figure number where such part is located. In the case of conductors designated by hyphenated reference numerals, the first digit designates the number of the figure where the conductor originates. In the case of circuit components, a designation including a decimal point represents a capacitance value in microfarads. A number followed by the symbol $\Omega$ gives a resistance value in ohms, while a number with the symbol k shows the resistance value in kilohms. Active circuit components have type designations applied thereto in certain cases to indicate the particular type of component found in a commercial embodiment of the illustrated circuit. Where a component is referred to in the specification, it is given a reference character in the form of letters and numerals, with the exemplary resistance, capacitance or type notation given in parentheses. Decade counters have been designated 7490 followed by a distinguishing letter to indicate circuit type SN 7490 by way of example. The voltage level plus five volts (direct current) is abbreviated (+5v) and the voltage level plus 24 volts (direct current) is abbreviated +24 V. D.C. All of the indicated parameters are given by way of illustration and not by way of limitation.

Pin or terminal numbers have been applied to various components in the drawings since these will readily be distinguished from hyphenated reference numerals as described above. These pin numbers correspond to those of commercially available components and thus provide further information as to the specific embodiment shown in the drawings.

Various gates having a designation including the digits 02 may be type SN 7402, while gates including 00 in their designation may be type SN 7400, for example. The comparators which include the digits 42 followed by an A may be type N 8242A, for example. The "D" type edge-triggered flip-flops including the digits 74 may be type SN 7474, for example.

Figure 2:
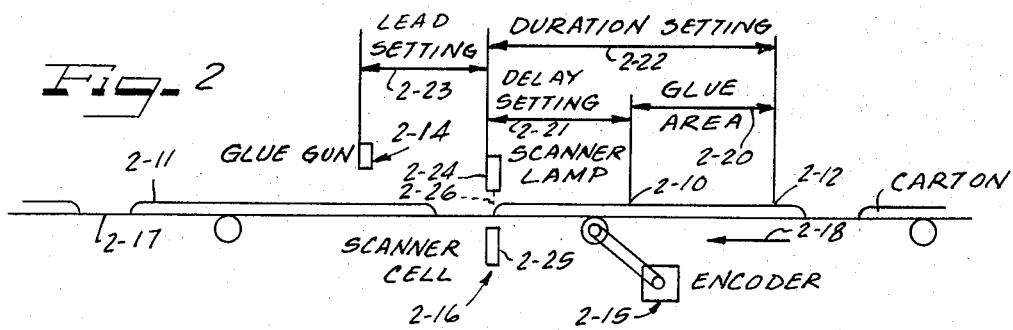
FIG. 2 is a diagrammatic showing of a production system to which the system of the present invention may be applied, and indicating the general arrangement of certain control components of the present invention as they would be applied to the production system.

The illustrated embodiment is a digital system utilizing preset adjustable digital comparators to initiate an operation at a predetermined location, for example such as location 2–10, FIG. 2, on each of a succession of cartons such as indicated at 2–11. By way of example the operation may continue until a second predetermined location such as indicated at 2–12 is reached. An alternative embodiment is capable of "stitching" within these predetermined locations, that is providing a sequence of on-off operations on the object 2–11 as the region between locations 2–10 and 2–12 moves past a work applying station such as indicated at 2–14.

By way of example, a controller according to the present invention may include an encoder located as indicated at 2–15 in FIG. 2 and a scanner located as indicated at 2–16. The encoder at 2–15 transmits encoder pulses as a function of movement of the conveyor indicated at 2–17, for example, moving in the direction of arrow 2–18. The scanner at 2–16 sends a signal to the controller by means of a change in voltage level to initiate the operations to be performed on each object 2–11. Each basic controller may control up to five channels, for example, giving the user five different operations from one scanner signal during a repeat interval between the successive moving objects 2–11.

The controller can be used in any application that requires a continuous precise repeat of operation. The illustrated model of the control system features a circuit called the actuator compensator delay which compensates for the mechanical delay in a user's apparatus at varying speeds of operation.

In its commercial form, the system includes a power unit, a main counter and comparator unit, and one channel unit providing the delay and duration signals for one mechanical operation such as the glue applying operation indicated by way of example in FIG. 2. The basic controller including one channel unit has a height dimension of nine inches, a width dimension of twelve inches and a depth dimension of seven and one-half inches. Each additional channel would involve an additional unit nine inches high by four inches wide by seven and one-half inches deep.

The encoder at 2–15 is mounted where it can be driven in step with the moving objects 2–11, for example five turns for one cycle of the moving objects. The drive to the encoder must be positive with relationship to the moving objects such as 2–11, since any slippage will cause the operation to lose accuracy.

If several different lengths of products are to be used, the encoder should be driven five turns per repeat of the largest product. Thus, the encoder with a given gearing can provide control for products with differences in length of up to ten inches, for example.

The scanner at 2–16 is mounted in an area where its light beam is interrupted by the moving object or some other element of the system which is moving in step with a reference point on the subject. With the illustrated system, the scanner is located before the controlled function acts on the moving object as illustrated in FIG. 2. As a rule of thumb, the distance between the scanner and the controlled function at work applying station 2–14 should be one-half of the length of the product. The system may be arranged so to become operable when the encoder is driven above a speed of about 20 revolutions per minute.

By way of example, if conveyor 2–17 moves 20 inches during five turns of the encoder 2–15, the encoder may supply a pulse for each 0.02 inch of movement of the objects 2–11.

In the commercial system, the main counter and comparator unit is provided with a zone thumbwheel switch which is set to allow for complete movement of the object through one repeat. The unit is also provided with a lead thumbwheel switch to compensate for the distance between the scanner and the actuator or controlled function. Thus if referring to FIG. 2 the distance between the scanner at 2–16 and the actuator at 2–14 is six inches then the lead setting would be six inches divided by 0.02 inches per encoder pulse or 300 encoder pulses. The unit also includes an actuator compensator knob to compensate for the delay in effecting operation of the actuator at 2–14. With respect to the zone setting, if the distance through one repeat is fifteen inches, then the zone setting would be fifteen inches divided by 0.02 inches per encoder pulse or 750 encoder pulses.

The channel unit would include a delay thumbwheel switch and a duration thumbwheel switch together with an on-off switch for selectively activating the channel.

The delay thumbwheel is set to actuate the control at the desired point after the occurrence of the scanner signal. Referring to FIG. 2, if the delay setting interval is five inches from the leading edge of the moving object to the location 2–10, then the delay setting would be five inches divided by 0.02 inch per encoder pulse or 250 encoder pulses.

The duration thumbwheel is set to stop the controlled function at the desired location such as indicated at 2–12 in FIG. 2. Thus if the distance from the leading edge of the moving object to location 2–12 is seven inches, the duration setting would be seven inches divided by 0.02 inch per encoder pulse or 350 encoder pulses.

Each additional channel delay and duration unit that is used would be set up similarily with respect to other operations on the objects 2–11, for example. If a given system utilized more than one channel, only the channels in use at a given time would have their on-off switches in the on position.

In determining the proper setting of the thumbwheels, the machine may be operated at slow speed, and any necessary corrections may be made by adjusting the thumbwheel switches.

To adjust the system for actuator delay, the machine may be first run at the top operating speed for the job and the actuator compensator knob on the main counter and comparator unit adjusted for the correct starting point of the controlled function. The speed may now be reduced to a minimum and the thumbwheels further adjusted if necessary.

FIG. 2 illustrates a particular application wherein a glue line is to be applied to each carton 2–11 from location 2–10 to location 2–12 by means of a glue gun at the actuator location 2–14.

Figure 3:
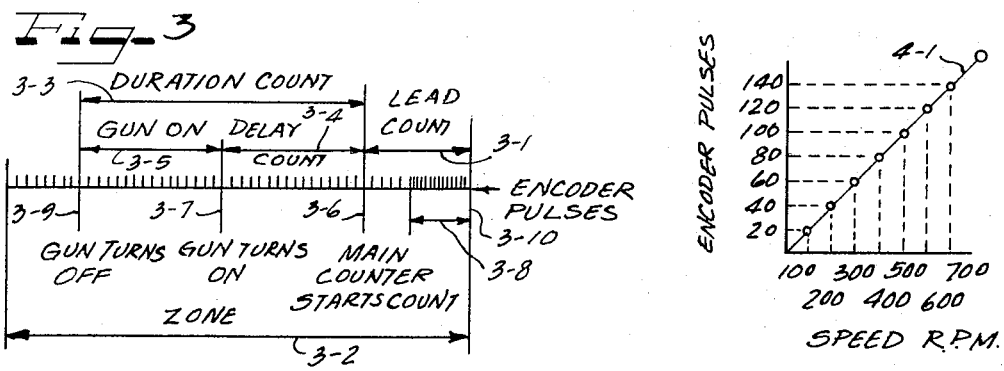
FIG. 3 is a schematic diagram showing a series of encoder pulses as generated in response to operation of the production line of FIG. 2 and useful in explaining the concepts of the present invention.

FIG. 3 illustrates the operation of the system of FIG. 2 in terms of encoder pulses.

Referring to FIG. 3, a lead counter begins counting when the leading edge of an object intersects the scanner beam at 2–16 and counts for a lead count value of encoder pulses, for example 300 as previously mentioned. Thus, the double headed arrow 3–1 in FIG. 3, may be taken as representing the setting of the lead thumbwheel switch on the main counter and comparator unit previously mentioned. Similarly, the zone setting may be represented by arrow 3–2, the duration setting by arrow 3—3, and the delay setting by arrow 3–4. Arrow 3–5 then indicates the number of encoder pulses corresponding to the difference between the duration setting and the delay setting, that is an interval corresponding to the glue area represented by arrow 2–20 in FIG. 2. By way of example, if the lead thumbwheel is adjusted for a lead setting of 300, a main counter component will begin counting after the occurrence of 300 encoder pulses. A vertical line 3–6 in FIG. 3 indicates the beginning of the main counter cycle. The delay count indicated at 3–4 may directly correspond to the distance represented by arrow 2–21 in FIG. 1, while the number of encoder pulses represented by arrow 3–3 in FIG. 3 may correspond to the distance indicated by arrow 2–22 in FIG. 2.

With respect to the distance represented by arrow 2–23 in FIG. 2, however, this distance would correspond to the number of encoder pulses to which the lead thumbwheel is set only for the case of a zero actuator delay. Thus, in the illustrated embodiment, the lead setting of the thumbwheel switch may be thought of as representing the lead distance 2–23 for the case of a very slow movement of the objects 2–11. In this case, the time delay of the actuator at 2–14 would be relatively negligible, so that it would be appropriate to supply the actuator-on signal represented by vertical line 3–7 essentially at the time that the location 2–10 was at the work applying location 2–14. That is, for the case of a glue line, the glue gun at 2–14 would become operative and begin applying the glue line essentially at location 2–10 even though the gun-on signal was initiated as location 2–10 arrived at the actuating station 2–14 (because of the assumed extremely slow speed of the conveyor 2–17). Now, if the conveyor were speeded up, it will be understood that the gun-on signal represented at 3–7 at FIG. 3 should occur in advance of the location 2–10 reaching the actuator position 2–14. In the illustrated embodiment, this is accomplished by generating double encoder pulses for an interval as indicated at 3–8 which is proportional to the speed of movement of the conveyor. The proportionality is represented by the straight line function 4–1 in the example of FIG. 4. Thus, at extremely low speed, no extra encoder pulses would be required, while for a given actuator delay as represented by line 4–1, at a speed corresponding to 100 revolutions per minute of the encoder at 2–15, it would be necessary to double the number of encoder pulses during an interval 3–8 with a total of 20 encoder pulses. On the other hand, if the conveyor were moving at a speed corresponding to 600 revolutions per minute of the encoder, the interval 3–8 would have a total of 120 double encoder pulses so as to start the counting of the main counter sooner, and thus supply the actuator-on signal substantially in advance of the time when location 2–10 reaches actuator position 2–14. The vertical line 3–9 in FIG. 3, represents the end of the duration count. Where the actuator turn-off delay is the same as the turn-on delay, the duration count corresponds directly to the desired length of the glue area as indicated at 2–20 in FIG. 2.

It will be observed that for the illustrated embodiment, the counter operation does not follow the same sequence as the physical sequence illustrated by FIG. 2. Thus, the diagram of FIG. 3 shows that the lead setting is first counted off, after which the delay setting is counted, while physically as represented in FIG. 2, the delay setting corresponds to the interval required for the location 2–10 to reach the scanner lamp, while the lead setting represents the time required thereafter for the location 2–10 to reach the actuator or work applying station 2–14.

Figure 4:
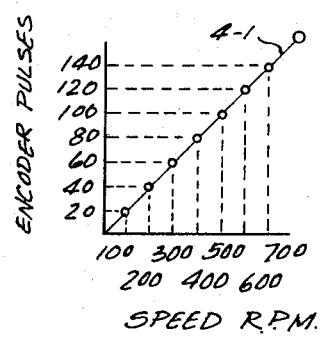
FIG. 4 is a graphical showing for explaining the operation of the actuator compensator of FIG. 1.

From the foregoing description in relation to FIG. 4, it will be understood that the length of the arrow 3–8 in FIG. 3 would vary as a function of the speed of movement of the conveyor. Since the arrow 3–1 represents a total lead count setting, for example, a settin of 300, it will be understood that the length of this arrow will be at a minimum for maximum conveyor speed, and will be at a maximum for minimum conveyor speed (where the normal encoder pulses are plotted with a uniform spacing and the double encoder pulses have one-half the normal spacing). If, to assist in visualizing the operation, it is assumed that the arrow 3–1 would be equal in length to the arrow 2–23 for very low speed operation of the conveyor, then arrow 3–1 would become progressively shorter with increasing speed of the conveyor to suggest that the actuator-on signal would be supplied further in advance of a location 2–10 reaching the work applying station 2–14. On the other hand, with the normal encoder pulses in FIG. 3 at constant spacing so as to represent uniform increments of movement regardless of conveyor speed, arrows 3–4 and 3–5 would have constant length regardless of conveyor speed and the length of these arrows could logically be idential to the length of arrows 2–21 and 2–20, respectively, in FIG. 2.

FIG. 1

FIG. 1 is in the nature of a schematic block diagram for illustrating the sequence of operation of a preferred embodiment of the present invention. The detailed circuitry for the components of FIG. 1 is found in FIGS. 5–12, and the associated detailed figure for each component has been indicated in parenthesis in FIG. 1.

Scanner component 1—1 of FIG. 1 includes the physical scanner lamp 2–24 and scanner 2–25 shown at scanner location 2–16 in FIG. 2. The scanner provides a scanner signal to a scanner trigger circuit 1–2 as indicated by signal flow line 1–3 when the light beam indicated by dash line 2–26 is interrupted by the leading edge of the successive articles 2–11.

The scanner trigger 1–2 shapes the scanner signals to the correct form and sends the signals to the actuator compensator circuit as indicated by line 1–5.

Encoder component 1–6 represents the circuitry associated with the physical component at 2–15 in FIG. 2 and provides encoder pulses of the correct shape and amplitude to the actuator compensator 104, main counter 1–7 and go-down circuit 1–8.

The actuator compensator 1–4 provides the means which compensates for the mechanical delay in the actuator relay solenoid or the like which effects the operation at the actuator station 2–14, FIG. 2. Specifically, the actuator compensator provides double encoder pulses during the interval 3–8 of FIG. 3 and provides the means for adjusting the actuator delay interval 3–8 in conformity with the relationship shown in FIG. 4. In the specific embodiment of FIG. 1, the double encoder pulses from the actuator compensator 1–4 are shown as being supplied to lead counter component 1–9.

The lead counter 1–9 counts double encoder pulses during the interval 3–8 and then counts normal encoder pulses, and supplies its output to zone comparator 1–10 and to lead comparator 1–11.

The main counter 1–7 begins counting as represented by vertical line 3–6 in FIG. 3 and counts encoder pulses, supplying its count to delay comparator 1–12 and duration comparator 1–13.

The lead comparator 1–11 is controlled by thumbwheel switches so as to be set to a desired count value such as represented by arrow 3–1 in FIG. 3. The lead count compensates for the difference in position between the scanner at location 2–16 and the actuator at location 2–14, the distance between these locations being indicated by arrow 2–23 in FIG. 2. The lead comparator sends an output signal to the main counter 1–7 to clear the main counter at the end of the lead count.

The zone comparator 1–10 provides a signal to indicate when the cycle is complete as represented by arrow 3–2 in FIG. 3. The signal from the zone comparator goes to the lead counter reset component 1–14 after the cycle in complete. The zone comparator serves to block out unwanted scanner signals.

The delay comparator 1–12 delays operation as represented by arrow 3–4 in FIG. 3 until the moving object is in the correct position to start the controlled function. The delay comparator provides signals to turn on the controlled function at the correct time, via output line 1–16.

The duration comparator 1–13 provides a signal to turn off the controlled function at the correct time, via output line 1–17. The duration comparator also sends a signal to the main counter reset component 1–18 after the controlled function is complete.

The main counter reset component 1–18 serves to reset the main counter after the duration comparator has turned off the controlled function.

The lead counter reset component 1–14 resets the lead counter 1–9 after the zone comparator 1–10 has completed its count.

The go-down circuit 1–8 prevents operation of the controller when encoder pulses are absent. A lamp (L 201, FIG. 7) which is located on the front of the main comparator and counter unit indicates when the encoder pulses are present. This circuit enables the duration comparator circuit, as represented by output line 1–20.

It may be noted that FIG. 1 is presented primarily for the purpose of facilitating a comprehension of the detailed circuit of FIGS. 5–12, and that FIG. 1 is not intended to represent the invention in a limiting sense, but only in an exemplary sense. It will be apparent that many modifications may be made within the basic concepts illustrated in FIGS. 2–4. Thus, the sequence of counter operations may be varied, and the basic concepts of the present invention may be applied to many different practical problems requiring suitable corresponding modifications of the particular embodiment illustrated in FIG. 1. Further, of course, the basic concepts are not limited to manually introduced settings, since the comparator settings, could be controlled by computer and selectively varied depending on characteristics of the work to which a given operation is being applied, for example. Thus, any of the manual adjustments or settings referred to herein for different types of work units or operating characteristics can be mechanized, and suitable readjustments could be computer-introduced during operation as necessary, to maintain any desired degree of accuracy or to meet any other quality control standard, or the like.

The following descriptions of the individual circuits of FIGS. 5–12 taken from the Operator's and Maintenance Manual for the commercial system will facilitate a complete understanding of the overall illustrated embodiments, and will enable one skilled in the art to fully understand the illustrated circuit when these descriptions are taken in connection with foregoing description of FIGS. 1–4.

FIG. 5. - Encoder

When the opening in the rotating disc of the encoder allows light from the light emitting diode TIL23 to strike the photo transistor LS600, the photo transistor becomes conducting. The voltage increases on the emitter of LS600 allowing C401 to charge through R403. Q401 which is a class "A" amplifier is always turned on by the voltage divider network of R403 and R404. Q401 is turned full on by charging of C401 and emitter follower Q402 is driven full on by Q401. The resulting signal on the emitter of Q402 is about four (4) volts. This signal is not a square wave, it is shaped more like a sine wave. C402 is used as a bypass to prevent the LS600 from going into oscillation. R401 is a current limit resistor for TIL23.

The signal on the emitter of Q402 is coupled to Q204 in the encoder amplifier thru C204. Q204 is a class "A" amplifier which is biased on by R206 and R209. A positive signal drives Q204 full on lowering the voltage to its lowest level on the collector of Q204. The voltage present on pin five (PIN 5) of the Schmitt trigger, (for example type SN7413), with Q204 conducting full on, will be below the level needed to trigger this component. A negative signal to Q204 will allow the collector to increase in voltage operating the Schmitt trigger. The signal from pin six (PIN 6) of the Schmitt trigger is a square wave which is fed to the counters via output conductor 5–1 labeled "ENCODER".

FIG. 6 - Scanner

Figure 6:
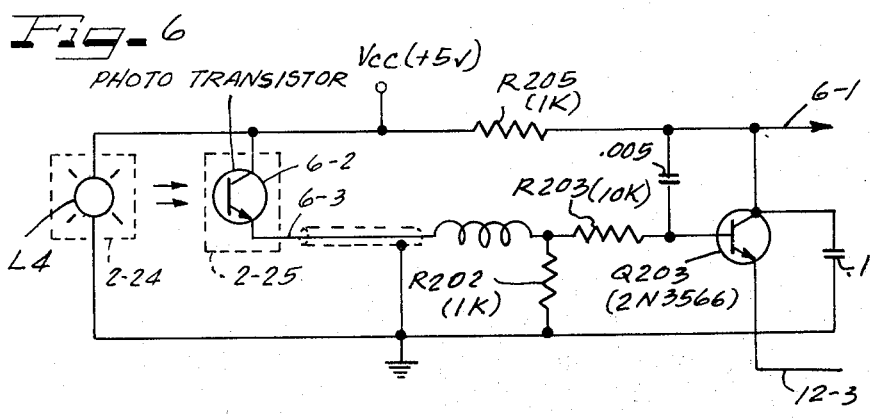
FIG. 6 shows a preferred electric circuit for the scanner and scanner trigger components of FIG. 1.

The scanner parts which are located at 2–16 in FIG. 2 include a section 2–24 housing lamp L4, FIG. 6, and section 2–25 mounting the photo transistor indicated at 6–2. When light from the lamp strikes the photo transistor, the output rises towards +5 volts creating a signal which is sent to the scanner trigger circuit located in the main comparator and counter unit, via conductor 6–3. When there is no light on the photo transistor, the transistor turns off and the output at conductor 6–3 will be low.

In the scanner trigger circuit which is also shown in FIG. 6, R202 serves as an emitter load resistor for the photo transistor 6–2. A positive signal to the base of Q203 thru R203 (which serves as a current limiter for Q203) will forward bias this transistor providing its emitter is at a lower potential. (Later it will be shown that the emitter is connected via output line 12–3 to a "D" type flip-flop 12–74A2 in the lead and main counter reset circuit of FIG. 12.)

When Q203 is turned on (by a positive signal on the base) its collector is drawn towards ground due to the voltage drop across R205, and this signal is applied via output line 6–1 to a Schmitt One Shot Trigger or Monostable 8–4 located in the actuator compensator circuit of FIG. 8. When the moving object blocks the scanner, the collector voltage of Q203 rises toward Vcc.

Figure 7:
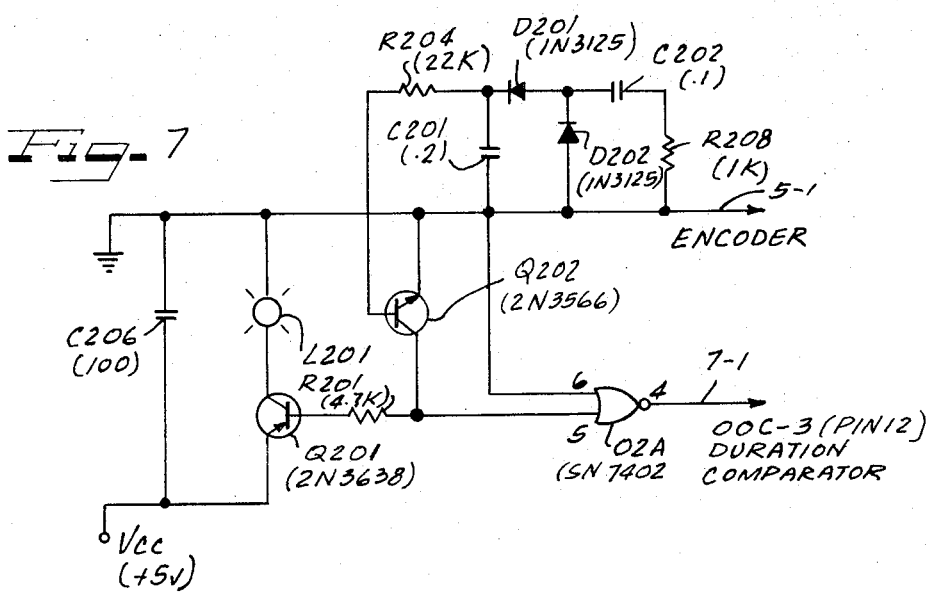
FIG. 7 shows a preferred electric circuit for the Go-Down component of FIG. 1.

FIG. 7-Go-Down Circuit

The Go-Down Circuit (indicated at 1–8 in FIG. 1) insures that the controlled function will not operate when the encoder shaft is not turning or signals from the encoder have failed. When encoder pulses are present at line 5–1 in FIG. 7, C202 is charged by current through R208 and D202. When C202 is charged, D201 is forward biased and allows C201 to charge. This places a positive voltage on the base of Q202, turning it on.

When Q202 is on, Q201 will conduct turning on L201 and causing a voltage drop across R201 and placing a low input on pin 5 of 02A. The other input on this gate is connected to ground and the output on pin 4 of 02A, conductor 7–1, will be high. This signal is sent to pin 12 of 00C-3 in the duration circuit of FIG. 11 and holds a high potential level on this pin.

FIG. 8 - Actuator Compensator Circuit

The Monostable 8–4 is shown as being a type SN74121A and will respond to a positive going signal at pin number 5 when pins 3 and 4 are connected to ground as shown. A positive signal from Q203 of the scanner circuit of FIG. 6 is supplied to pin 5 via conductor 6–1 when the leading edge of the moving object blocks the scanner cell. This signal sets the Q output at pin 6 high and the Q output at pin 1 low. The output from pin 6 sets pin 10 of 00B high allowing encoder pulses to pass through this gate when they are received on pin 9 of 00B. The leading edge of each encoder pulse initiates a pulse via 02A-1, 02B-1 and 02B-2 of a width determined by capacitor C210. The trailing edge of each encoder pulse initiates a pulse via 02A' and 02B of a width determined by capacitor C209. The leading and trailing pulses are combined through 02B-3 and result in doubling the encoding pulses. The double encoder pulses are fed to pin 1 of the 00B-1 and through to the lead counter via conductor 8–1. The Q output will remain high until the timing components P201 and C203 allow the Monostable 8–4 to return to normal state. This length can vary from 40 nanoseconds to 40 seconds by choosing appropriate timing components. With the values of the components now used, the length of output pulse varies from 4 milliseconds to 40 milliseconds.

FIG. 9 - Lead and Main Counter Circuit

This circuit consists of six 7490 counters. These counters are of the decade type and have a count input at pin 14 as indicated for unit 7490A, a reset input at pin 2, and four outputs such as indicated at 9–1 through 9–6 for respective decade units. The encoder pulses (or double encoder pulses) such as represented in FIG. 3 vary between the zero logic state (zero volts) and the logical one state (plus five volts). At reset, the decade counter has all outputs at logical zero state. At the first negative transition of an encoder pulse (during the drop from plus five volts to zero volts), the decade counter one output changes to the logical one state (positive) while outputs 2, 4 and 8 remain at the logical zero state. The next negative transition sets the one output to logical zero, the two output to the logical one state, and the four and eight outputs remain at logical zero. The third transition sets one and two outputs to the logical one state and the four and eight outputs at logical zero. At the ninth transition, one and eight outputs are at the logical one state and two and four outputs are at logical zero. The tenth transition resets all outputs to the logical zero state. A positive signal on the reset input such as indicated at 12–4 for the lead counter and 12–5 for the main counter sets all output terminals to the logical zero state.

Encoder pulses, either double or single, are fed to pin 14 of the 7490A decade of the lead counter. The output of the lead counter feeds the zone and lead comparators of FIG. 10. The main counter receives straight encoder pulses on pin 14 thereof via conductor 8–3 from the encoder, via the circuit indicated at 5–1 and 8–3 in FIG. 8. It will be shown later that the main counter is reset after the lead comparator counts to its setting. See FIG. 3 previously described. Outputs of the main counter feed the channel delay and duration comparators of FIG. 11.

If more than two channels are used, the output of the main counter is feed to two SN7404 and three SN7437 circuits. These integrated circuits are required to drive the comparator on three or more channels.

Figure 10:
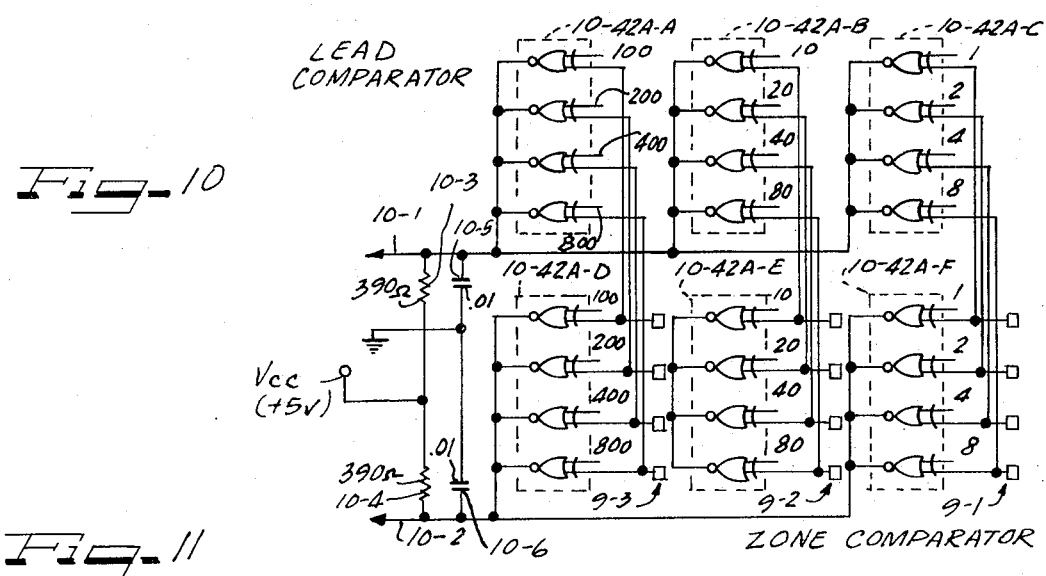
FIG. 10 shows a preferred electric circuit arrangement for the lead comparator and zone comparator components of FIG. 1.

FIG. 10- Zone and Lead Comparator

The lead comparator receives its count from the lead counter. This circuit is made of one thumbwheel switch, 3 8242 circuits (designated 10–42A—A, 10–4-2A–B and 10–42A–C in FIG. 10), a 390 ohm resistor, and a 0.01 microfarad capacitor. When the counts applied to the input terminals 9–1 through 9–3 from the lead counter reach the present number on the thumbwheels, the common output line 10–1 will go high. The inputs to the comparator from the thumbwheels designated by numerals corresponding to the weights assigned to the various thumbwheel output conductors, that is 1, 2, 4, 8, 10, 20, 40, 80, 100, 200, 400 and 800. The signal from the lead comparator is feed to pin 12 of gate 12–00B of FIG. 12 to clear the main counter.

The zone comparator also receives its count from the output terminals 9–1, 9–2 and 9–3 of the lead counter. When the count in the lead counter reaches the preset number on the zone thumbwheel output lines which lead to the zone comparator circuits 10–42A-D, 10–4-2A-E and 10–42A-F, the output from the zone comparator is feed via conductor 10–2 to the lower input of gate 12–02A to clear flip-flop 12–74A2 for the next scanner signal.

The 390 ohm resistor associated with each of the output lines and designated by reference numerals 10–3 and 10–4 are used as common loads with respect to the lead and zone comparator stages and are connected in common to $V_{cc}$. The 0.01 microfarad capacitors designated by reference numerals 10–5 and 10–6 are used as noise filters for the lead and zone comparators, respectively, and are connected in common to ground potential.

Figure 11:
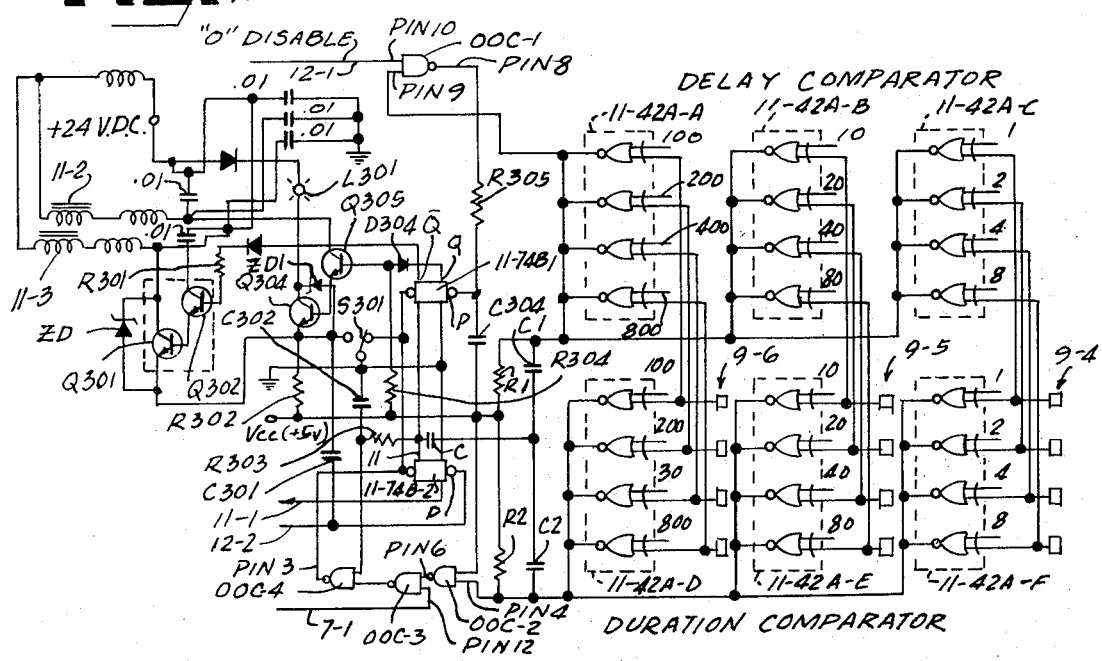
FIG. 11 shows a preferred electric circuit for the delay comparator and duration comparator components of FIG. 1.

FIG. 11- Delay and Duration Comparators and Control Circuit

The delay comparator 11–42A—A, 11–42A-B and 11–42A–C operates in the same way as the lead comparator. When the main counter is operating, its count is fed via the sets of terminals 9–4, 9–5 and 9–6 to the delay comparator, and when the preset count on the thumbwheels is reached, the output is fed to pin 9 of 00C-1. If pin 10 of 00C-1 is high, pin 8 of 00C-1 goes low. This signal is supplied to the preset input P of flip-flop 11–74B1 and sets the Q output thereof to logical one (high). A high output at Q of 11–74B1 will turn on Q305 which turns on Q304. With switch S301 in the left hand "on" position the ground path of the control circuit is now connected to ground through Q304 and S301. Lamp L301 will be turned on when Q304 is conducting. D304 is used as a current limit for Q305, and R304 serves as a pull up resistor. Conductor 12–1 ("O" disable) connects with a pin 10 of gate 00C-1 to prevent operation when a counter fails.

By way of example, actuator solenoids have been indicated at 11–2 and 11–3. By way of example, acuator solenoid 11–2 may be energized at the time represented by the vertical line 3–7 in FIG. 3, while the solenoid 11–3 may be energized at the time represented by the vertical line 3–9. The time interval 3–8 in FIG. 3 would represent the time delay in actuation of a desired function by solenoid 11–2, and for the illustrated embodiment the same time delay would be involved in de-actuating the desired function by means of solenoid 11–3. A Zenner diode ZD is shown connected across transistor Q301, and a similar Zenner diode would be connected across Q304. Each Zenner diode would be a type 1N5383.

The duration comparator comprises stages 11–42-A–D through 11–42A–F and operates in the same way as the delay comparator. When the preset count on the thumbwheels of stages 11–42A–D, etc. is reached, the output of the duration comparator goes to a logical one condition (high). This is fed to pin 4 of 00C-2. The output at pin 6 of 00C-2 will be low and this output fed to the upper input of 00C-3 along with a high on the lower input will cause a high output from 00C-3. Pin 3 of 00C-4 will be low sending a clear signal to the preset input of flip-flop 11–74B-2. This will result in a low potential condition at the Q output of 11–74B-1 turning off the controlled function, for example de-energizing solenoid 11–2 and energizing solenoid 11–3. The Q output of 11–74B-2 is connected via line 11–1 to SN7430 (gate 12–30) in FIG. 12 and will go to a high potential condition at this time. R305, R303, C, and C304 insure a slow turn of 11–74B-1 and B-2 to the logical one condition at the preset input of 11–74B-1 and at the clock input, terminal 11, of 11–74B-2 when the power is turned on. C302 is used as a filter. R302 and C301 are used to prevent bounce from the switch affecting the turn on of 11–74B-1 and 11–74B-2.

Transistors Q302 and Q301 form an optional circuit which as indicated can provide the user with a "push-push" output. This circuit is identical to the turn on circuit which operates from Q of 11–74B-1. The optional circuit is connected to Q of 11–74B-1 and will turn on Q301 when Q304 is turned off.

The following are exemplary circuit values and other perameters for an embodiment in accordance with FIG. 11:

Q301, 2N5239; Q302, 2N2102; Q304, 2N5239; Q305, 2N2102; 0304, 1N459; C301, 0.001 microfarad; C302, 100 microfarad; C, 0.01 microfarad; C304, 0.1 microfarad; C1, 0.01 microfarad; C2, 0.01 microfarad; R301, 470 ohms; R202, 2.2 kilohms; R303, 1 kilohm; R304, 470 ohm; R305, 100 ohms; R1, 390 ohms; R2, 390 ohm.

Figure 12:
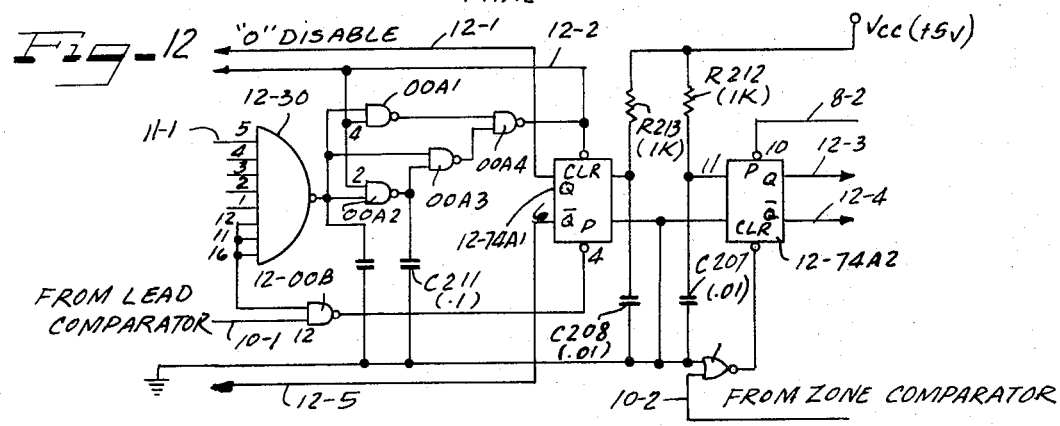
FIG. 12 shows a preferred electric circuit diagram for the lead counter reset and main counter reset components of FIG. 1.

FIG. 12-Lead and Main Counter Reset Circuit

This circuit receives signals via conductors 10–1 and 10–2 from the lead comparator and the zone comparator, respectively. Conductor 8–2 leading to the preset input of 12–74A-2 originates at the Q output (pin 1) of SN74121A, FIG. 8. The input signal from the actuator compensator of FIG. 8 supplied via line 8–2 to the preset input of flip-flop 12–74A-2, when a scanner signal is received, sets the Q output 12–4 to a low potential condition and enables the lead counter, FIG. 9, for the next cycle. The high input signal on conductor 10–1 from the lead comparator, when the lead count 3–1, FIG. 3, has been reached, is present on pin 12 of 12–00B and provides a low potential input at preset input for flip-flop 12–74A-1; this in turn enables the main counter via output conductor 12–5 from pin 6 of 12–74A-1.

The input signal at conductor 11–1 of gate 12–30 (SN7430 for example) provides a high potential level at the end of the duration count indicated at 3–3 in FIG. 3 for the given channel. Comparable inputs from other channels could be provided at pins 1–4. When all inputs to the gate 12–30 are positive (inputs being connected together to $V_{cc}$ except one for each channel being used), the output from the gate 12–30 goes to a low potential condition. This signal is sent to one input of each of gates 00A1, 00A2 and 00A3. These gates together with gate 00A4 are used as a signal stretcher to give a pulse of the correct width needed for operation of the circuit. The output from 00A4 is used as a clear pulse to flip-flop 12–74A-1. The output of 00A4 is also supplied via conductor 12–2 to the clear input of flip-flop 11–74B-2 of FIG. 11. The circuit holds the output from 00A4 until capacitor C211 charges by feeding its own signal back to pin 4 of 00A1 and pin 2 of 00A2. R212, R213, C207 and C208 are used to insure that the flip-flop 12–74A-1 and the flip-flop 12–74A-2 are set to correct condition when the power is turned on.

SUMMARY OF OPERATION OF THE ILLUSTRATED EMBODIMENT

The illustrated embodiment thus shows an example of apparatus for controlling a selected one of a plurality of work performing devices such as the glue gun indicated at location 2–14 in FIG. 2 and having an actuator solenoid as indicated at 11–2 in FIG. 11. Each such work performing device is actuatable to an operating condition in response to an actuating signal such as that supplied by turn on of transisors Q304 and Q305 in FIG. 11. Each work performing device, however, will have a different time delay in reaching actuated condition, for example by virtue of inductance, mechanical inertia and the like. The selected work performing device such as the glue gun at location 2–14 is located at an operating position along the path of movement of material such as articles 2–11 which move in the direction of arrow 2–18 with a conveyor 2–17. By way of example, each article is to be acted upon along a continuous region between locations 2–10 and 2–12, as represented by the arrow 2–20 in FIG. 2, this region being termed the "glue area" along which a glue line is to be dispositied by means of the glue gun at the operating position 2–14. As an alternative, the glue gun can be cyclically actuated on and off between location 2–10 and 2-12 in a "stitching" operation to deposit successive small beads of glue along the glue area indicated at 2-20.

The apparatus is characterized by the capability of being adjustable to automatically compensate for the time delay in actuation of any of the work performing devices to the operating condition. For example, the actuator compensating circuit of FIG. 8 may be adjustable by selection of capacitors at C203 and by adjustment of the potentiometer P201 to provide any desired time delay between four milliseconds and forty milliseconds. The adjustment can vary from forty nanoseconds to forty seconds by choosing appropriate timing components. Thus, the illustrated apparatus is capable of compensating for the time delay in actuation of any selected one of a plurality of work performing devices. Further the compensating adjustment is effective over a substantial range of speeds of movement of the material along the path of conveyor 2-17, for example over a range of speeds corresponding to rotational speeds of the encoder at 2-15 from 20 revolutions per minute up to 700 revolutions per minute as represented in FIG. 4.

The apparatus comprises a reference signal circuit such as the scanner circuit of FIG. 6 responsive to the position of the material relative to the operating position and operable to generate a reference signal each time one of the successive work receiving locations reaches a predetermined distance from the operating position such as the distance of work location 2-10 from the operating position 2-14 as represented in FIG. 2 where the leading edge of an article 2-11 is just intercepting the scanner beam 2-26 at scanner location 2-16.

Figure 5:
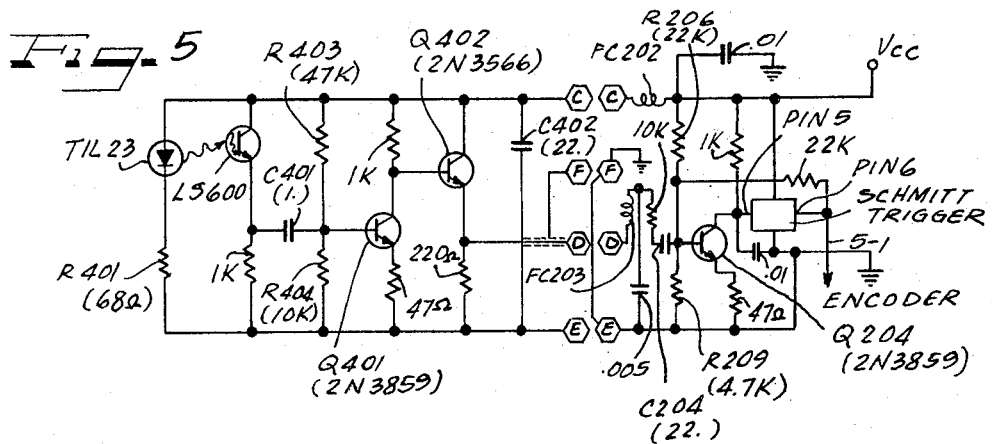
FIG. 5 shows a preferred electric circuit for the encoder of FIG. 1.

An encoder at location 2-15 includes the circuit of FIG. 5 responsive to successive uniform increments of movement of the material along the conveyor path to generate successive encoder pulses as represented in FIG. 3. Each of the normal encoder pulses occurring after the interval 3-8 represents a predetermined increment of movement of the material irrespective of the speed of the conveyor 2-17. As previously mentioned, each normal encoder pulse may represent a movement of the conveyor of 0.02 inch, for example.

An adjustable counter circuit is provided connected with the encoder for counting encoder pulses beginning with the occurrence of the reference signal at a time such as represented at 3-10 in FIG. 3. The circuit emits an actuating signal at the time represented by vertical line 3-7 in FIG. 3 to the work performing device such as the glue gun at 2-14 when the count in the counting circuit reaches a selected count value as determined by the adjustable thumbwheels controlling the comparator circuits 10-42A—A, 10-42A-B, 10-42A-C of FIG. 10 and 11-42A—A, 11-42A-B, 11-42A-C of FIG. 11. These thumbwheels provide digital signals to the input conductors of the comparators which have been labeled with the weights 1, 2, 4, 8, 10, 20, 40, 80. 100, 200, 400, 800, so that each set of thumbwheels in the illustrated embodiment can be adjusted to respond to a count value between zero and 999 (decimal). The lead comparator of FIG. 10 responds to the count value in the lead counter 7490A, 7490B, 7490C of FIG. 9, while the delay comparator of FIG. 11 responds to the count in the main counter 7490D, 7490E, 7490F of FIG. 9, each counter also having a capacity to count between zero and 999 (decimal).

An adjustable compensating circuit such as that illustrated in FIG. 8 is adjustable to compensate for time delays of the actuator within the predetermined range so as to compensate for the time delay of the selected work performing device irrespective of the speed of movement of the material, the compensating circuit being responsive to the encoder pulses at the input 5-1, FIG. 8 and comprising an adjustable timer designated by reference 8-4 operable to control the supply of extra pulses to the counter circuit over an adjustable time interval such as represented at 3-8 in FIG. 3. The time interval is selected to substantially correspond to the time delay of the selected work performing device, the counter circuit thus attaining the selected count value in advance of each work receiving location such as 2-10 reaching the operating position such as 2-14 by an amount to compensate for the time delay of the selected work performing device. As indicated in FIG. 4, the number of double encoder pulses supplied by the compensating circuit of FIG. 8 increases in proportion to the speed of movement of the conveyor so that the time delay of the actuator is compensated irrespective of the speed of movement of the material.

MODIFICATIONS AND VARIATIONS

While in the illustrated embodiment, a linear motion of material is converted into a rotary motion of the encoder at 2-15, it will be apparent that encoder pulses can be generated directly as a function of spindle speed for example, so as to initiate another function after a given rotation of a spindle or the like. While in an initial embodiment, clamping diodes were provided across the output actuators such as indicated at 11-2 and 11-3, it is found that by omitting such clamping diodes, time delay is reduced and actuating speed increased.

In the illustrated embodiment intended for maximum economy, noise immunity has been designed into electric circuit by providing inductors and capacitors at the input and output lines of the power supply, scanner and encoder circuits and the output circuits of FIG. 11. These coils and capacitors are added and have values to filter high frequency pulses which might otherwise cause spurious operation. As an alternative, it would be possible to utilize a much more expensive cabinet providing shielding for the electronic components. The Schmitt Trigger circuits are adjusted to operate as amplitude discriminators for rejecting spurious low voltage amplitude pulses. The circuitry as illustrated has been designed to operate with relatively low cost power supply, again for maximum economy.

The high speed circuit as illustrated in FIG. 11 including Zenner diodes ZD and ZD1 across the output transistors Q301 and Q304 are particularly desirable where it is desired to drive a solenoid or the like on and off in as short a time as possible, for example to provide successive glue dots of minimum size along a seam or the like.

In an optional circuit termed the real time output circuit, once the controlled function is turned on, turn off is controlled thorough a resistance-capacitance circuit. Thus, when the count on the delay thumbwheel is reached, the output signal from Q305 is sent to the real time circuit. At the end of the determined time interval, the controlled function is turned off. In one embodiment, the output time could be adjusted from two milliseconds to 25 milliseconds by adjusting a potentiometer.

A number of modifications of the illustrated circuit are readily made so as to meet the requirements of particular customers. In a simplified model, the main counter and comparator unit of the illustrated embodiment may serve to cut any desired number of pieces from a continuous length, for example 1,000 pieces each five inches long, after which the unit may be set to cut 3,000 pieces each 13 inches long. Since the encoder deals in units of length, it is not necessary to set the position of limit switches or the like as a function of the varying speed of the work material. Additional channels may be provided as needed to paint stripes on elongated material or the like, a function which is not practical with microswitches.

In another simplified embodiment, no lead counter is utilized and the actuator delay compensation double pulses are supplied directly into the main counter. In a continuous mode of operation such as that utilized simply to paint stripes on moving elongated material, for example, it may be unnecessary to utilize a scanner, in which case this component is readily omitted from the illustrated embodiment.

Viewed in its broadest aspects, the present invention can be viewed as providing a compensating circuit for controlling counting of a counting circuit, for example, the lead counter, in step with travel of a working element, for example the shaft driving the encoder, in each of a succession of operating cycles. The compensating circuit is operable in each such operating cycle to introduce an extra count value, for example in accordance with the function 4–1 in FIG. 4, so that the extra count value varies with the rate of movement of the working element, to advance the time of occurrence of the turn-on signal such as represented at 3–7 in FIG. 3, as a function of the speed of the operating element. Such a concept would then comprehend a conveyor controlled to maintain a selected speed, and a digital register for containing an extra count value in accordance with the selected conveyor speed. The extra count value could then be introduced into the lead counter in each operating cycle. The lead counter capacity could be such as to adequately represent the end of each operating cycle over the range of speeds to be covered. Turn-off of the controlled function could be timed in relation to the turn-on thereof by means of a real-time timer circuit, for example.

While in the illustrated embodiment, the start of each operating cycle is accomplished by reset of the lead counter in response to the scanner output at 6–1, FIG. 6, the scanner output could instead serve to gate encoder pulses into the lead counter. In this case when the lead counter reached its maximum count and reset to zero, the reset output would shut off encoder pulses until the next scanner pulse was received, and also, for example, cause transfer of the registered extra count value into the lead counter in preparation for the next operating cycle. For this approach, the extra count value may correspond to the total of the extra encoder pulses shown in FIG. 3, that is one-half the total number of double encoder pulses as represented by the ordinate in FIG. 4.

SUMMARY OF FEATURES

It will be observed that the scanner circuit of FIG. 6 is controlled by conductor 12–3 from flip-flop 12–74A-2 of FIG. 12, so that the scanner circuit is responsive to scanner signals only during the time interval when the flip-flop 12–74A-2 is reset. Resetting of the flip-flop 12–74A-2 takes place at the end of the zone count indicated at 3–2 in FIG. 3, under the control of conductor 10–2 from the zone comparator.

The actuator delay compensator circuit of FIG. 8 is adjustable directly in milliseconds by means of the knob controlling the setting of potentiometer P201. Thus, whenever a given actuator having a given delay is to be utilized in the system, it is possible to set the potentiometer P 201 directly to the time delay equal to this actuator delay. This greatly facilitates set up. Further, it is possible to physically measure actuator delay with suitable transducers so as to facilitate the setting of the potentiometer P201, the potentiometer setting then being suitable regardless of any variations in the conveyor speed.

The same basic system can be simplified by omitting components such as the scanner or lead counter where a particular application makes this possible, or conversely, additional features may be readily added such as the stitching option or the real time output options mentioned above. The result is an extremely economical and versatile system having the greatest possible economy and simplicity of manufacture to meet varying requirements.

I claim:

1. In an apparatus for controlling a work performing device located at an operating position and actuatable to an operating condition in response to an actuating signal after a substantial time delay, and operable at successive work receiving locations of material moving along a path past the operating position, said apparatus comprising:

a. a reference signal circuit responsive to the position of said material relative to said operating position and operable to generate a reference signal each time one of the successive work receiving locations reaches a predetermined distance from the operating position, b. an encoder responsive to successive uniform increments of movement of the material along said path to generate successive encoder pulses, each pulse representing a predetermined increment of movement of the material irrespective of the speed thereof, c. an adjustable counter circuit connected with said encoder for counting encoder pulses beginning with the occurrence of each of said reference signals and for emitting said actuating signal to the selected work performing device when the count in said counting circuit reaches a selected count value corresponding to said predetermined distance, and d. an adjustable compensating crcuit including a timer adjustable to provide a timing cycle of time duration selected to substantially correspond to the time delay of the work performing device, wherein the improvement comprises e. said compensating circuit including a pulse doubler circuit connected with the encoder for receiving a train of encoder pulses therefrom, and connected with said timer and controlled by the timing cycle thereof to supply two encoder pulses for each encoder pulse received from the encoder for the time duration of said timing cycle, and thus to supply at its output a train of doubled encoder pulses for the time duration of said timing cycle, f. said pulse doubler circuit having its output connected with said adjustable counter circuit to supply said train of doubled encoder pulses to said adjustable counter circuit, thereby to compensate for such time delay in the operation of the work performing device.

2. In an apparatus for controlling a work performing device located at an operating position and actuatable to an operating condition in response to an actuating signal after a time delay, and operable at successive work receiving locations of material moving along a path past the operating position, said apparatus comprising:

a. a scanner located at a scanner location disposed at a lead distance in advance of the operating position along the path of movement of the material, and operable to supply a scanner output signal as each scanner actuating location of the material reaches said scanner location and thus to begin a scanner initiated cycle of operation, b. an encoder responsive to successive uniform increments of movement of the material along said path to generate successive encoder pulses, each pulse representing a predetermined increment of movement of the material irrespective of the speed thereof, c. an adjustable lead counter circuit connected with said encoder to receive and count encoder pulses and adjustable to a lead count value corresponding to the lead distance, and responsive to reaching a count value equal to said lead count value to emit a lead counter output signal, d. an adjustable delay counter circuit connected with said encoder to receive and count encoder pulses and adjustable to a delay count value corresponding to the distance between each scanner actuating location of the material and the associated work receiving location of the material and responsive to reaching a count value equal to said delay count value to emit a delay counter output signal, e. an adjustable compensating circuit connected with said encoder and operable to control the supply of a series of additional pulses alternating in time with said encoder pulses to said adjustable lead counter circuit during each scanner initiated cycle of operation for a time interval adjusted so as to substantially equal said time delay in the operation of said work performing device, and f. sequencing circuitry connected to said lead counter circuit, said delay counter circuit and said compensating circuit and responsive to said scanner output signal to operate said lead counter circuit to count both encoder pulses from said encoder and the additional pulses alternating in time therewith from said compensating circuit, and responsive to said lead counter output signal to operate said delay counter circuit to count encoder pulses, and responsive to said delay counter output signal to generate said actuating signal, thereby to effect actuation of said work performing device to said operating condition substantially as each work receiving location of the material reaches the operating position.

3. Apparatus for controlling an output function having a time delay in its response to a turn-on signal and for coordinating the execution of the output function with the travel of a working element, said apparatus including:

a. an adjustable counting circuit operable to count in step with successive increments of movement of the working element and adjustable to a selected count value representing a desired travel of the working element after occurrence of an initiating event, before the output function is to be executed, and b. an adjustable timing circuit adjustable to execute a timing cycle of a time duration selected to correspond to said time delay in the execution of the output function, wherein the improvement comprises:

c. a compensating circuit connected with said counting circuit and with said timing circuit and controllable to respond to each increment of movement of the working element during said timing cycle of said timing circuit to supply an additional count to said counting circuit, and d. sequencing circuitry responsive to the occurrence of the initiating event to initiate the counting operation of said counting circuit and to actuate said timing circuit to execute said timing cycle, and responsive to the counting circuit reaching said selected count value to supply said turn-on signal, thereby to compensate for said time delay in the response to the turn-on signal.

4. In an apparatus for controlling a work performing device located at an operating position and actuatable to an operating condition in response to an actuating signal after a time delay, and operable at successive work receiving locations of material moving along a path past the operating position, said apparatus comprising:

a. a scanner located at a scanner location disposed at a lead distance in advance of the operating position along the path of movement of the material, and operable to supply a scanner output signal as each scanner actuating location of the material reaches said scanner location and thus to begin a scanner initiated cycle of operation, b. an encoder responsive to successive uniform increments of movement of the material along said path to generate successive encoder pulses, each pulse representing a predetermined increment of movement of the material irrespective of the speed thereof, c. a lead counter connected with said encoder and controllable to count encoder pulses, d. an adjustable lead comparator circuit connected with said lead counter and adjustable to a selected lead count value corresponding to the lead distance, and responsive to the lead counter reaching a count value equal to said lead count value to emit a lead counter output signal, e. a compensating circuit connected with said encoder for receiving encoder pulses therefrom and connected with said lead counter for introducing into said lead counter an extra count value of a magnitude which is a function of the rate of movement of the material and the time duration of the time delay in the operation of the work performing device, f. a main counter connected with said encoder and controllable to count encoder pulses, g. an adjustable delay comparator circuit connected with said main counter and adjustable to a selected delay count value corresponding to the distance between each scanner actuating location of the material and the associated work receiving location of the material and responsive to the main counter reaching a count value equal to said delay count value to emit a delay comparator output signal, h. an adjustable duration comparator circuit connected with said main counter and adjustable to a selected duration count value generally corresponding to the distance from each scanner actuating location of the material to a location at which the operating condition of the work performing device is to be discontinued, and responsive to the main counter reaching said duration count value to emit a duration comparator output signal, i. an adjustable zone comparator circuit connected with said lead counter and selectively settable to a zone count value generally corresponding to the distance between successive work receiving locations of the material and responsive to the main counter reaching said zone count value to emit a zone comparator output signal, and j. sequencing connected to said scanner, said lead counter, said lead comparator circuit, said compensating circuit, said main counter, said delay comparator circuit, said duration comparator circuit and said zone comparator circuit and responsive to said scanner output signal to initiate counting operation of said lead counter, responsive to said lead comparator output signal to initiate counting operation of said main counter, responsive to said delay comparator output signal to supply said actuating signal to the work performing device, responsive to said duration comparator output signal to terminate operation of said work performing device, and responsive to said zone comparator output signal to reset said lead counter in preparation for a further scanner initiated cycle of operation.

* * * * *